United States Patent [19]
Graham

[11] Patent Number: 5,823,630
[45] Date of Patent: Oct. 20, 1998

[54] PIVOT LIP DUMP GATE

[75] Inventor: Donald D. Graham, Omaha, Nebr.

[73] Assignee: Omni Holding Company, Omaha, Nebr.

[21] Appl. No.: 818,753

[22] Filed: Mar. 14, 1997

[51] Int. Cl.[6] ................................................. B62D 33/02
[52] U.S. Cl. ................ 298/235; 298/23 M; 298/23 MD; 296/51
[58] Field of Search ............................ 298/23 M, 23 MD, 298/23; 296/51

[56] References Cited

U.S. PATENT DOCUMENTS

| | | | |
|---|---|---|---|
| 2,020,451 | 11/1935 | Atwell | 296/51 |
| 2,249,932 | 7/1941 | Beal | 296/51 |
| 2,502,079 | 3/1950 | Duis et al. | 296/51 |
| 3,235,310 | 2/1966 | Medley et al. | 298/23 MD |
| 3,272,552 | 9/1966 | Park | 298/23 MD |
| 3,572,837 | 3/1971 | Lackey | 298/23 S |
| 3,977,718 | 8/1976 | Nordberg | 298/23 MD |
| 4,024,671 | 5/1977 | Isobe | 296/51 |
| 4,699,428 | 10/1987 | Vick | 298/23 MD |
| 5,281,074 | 1/1994 | Mashuda | 298/23 MD |

FOREIGN PATENT DOCUMENTS

| | | | |
|---|---|---|---|
| 730597 | 3/1966 | Canada | 298/23 S |
| 2606340 | 5/1988 | France | 298/23 S |

*Primary Examiner*—Dean Kramer
*Assistant Examiner*—Douglas Hess
*Attorney, Agent, or Firm*—Zarley,McKee,Thomte Voorhees & Sease; Dennis L. Thomte

[57] ABSTRACT

A pivot lip dump gate for the dump body of a dump truck, trailer or the like comprises a split gate including a large upper hinged gate portion and a hinged lower gate or lip which serves the double function of guiding contents rearwardly from the dump body in its lowered dumping position and for closing the rearward end of the dump body in its raised transport position while also serving to lock the swinging upper gate in its closed transport position.

6 Claims, 5 Drawing Sheets

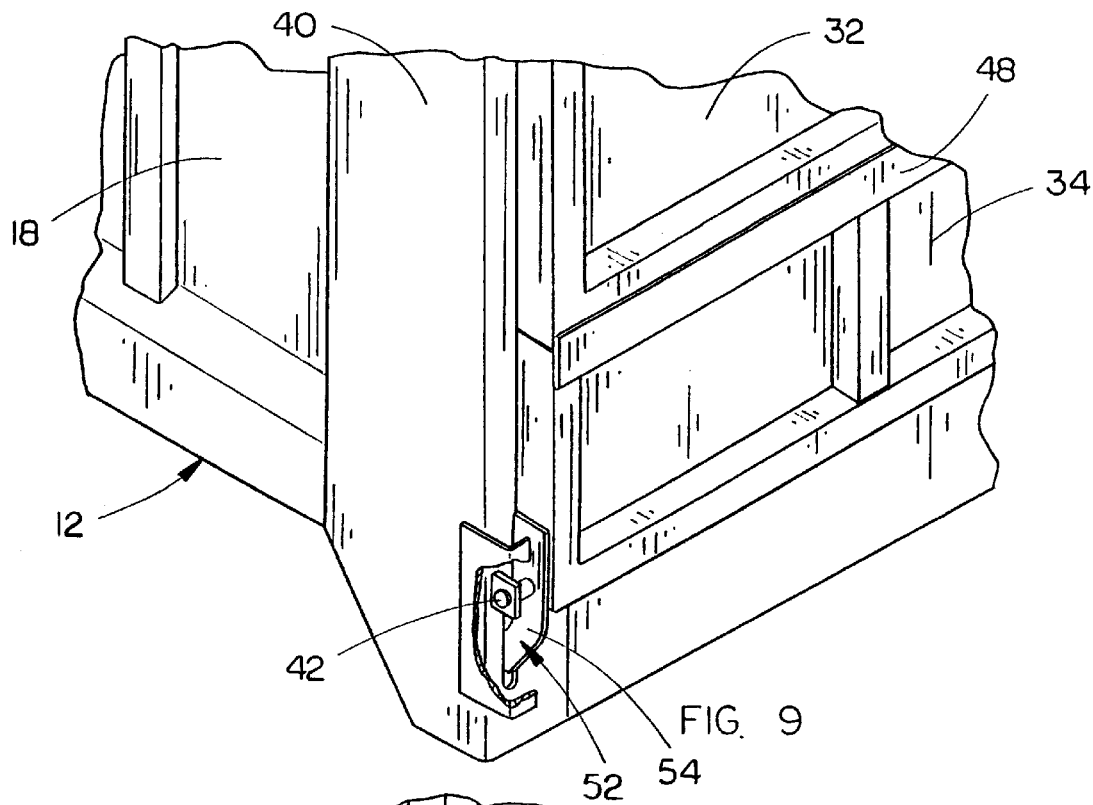
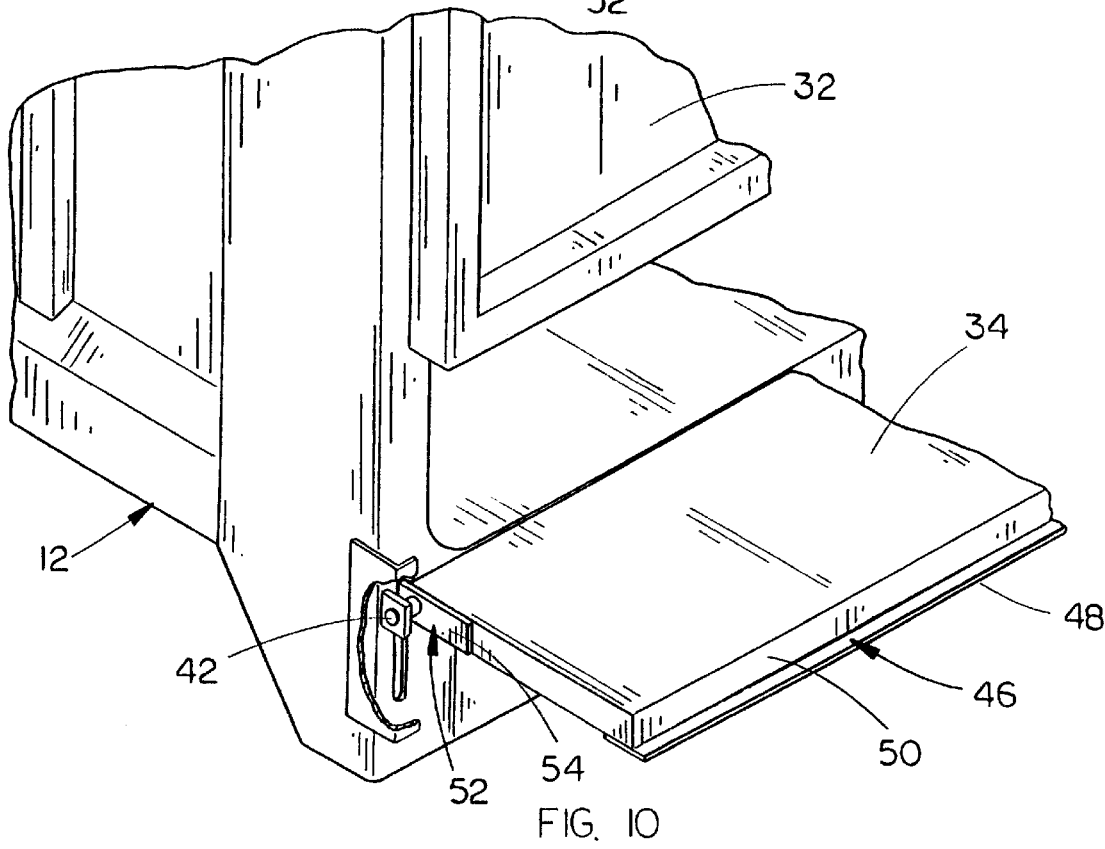

PIVOT LIP DUMP GATE

BACKGROUND OF THE INVENTION

1. Technical Field

The present invention is directed generally to an improved rear gate for the dump body of a truck, trailer or the like, and more particularly to a pivot lip dump gate wherein a shortened hanging upper gate is used in combination with a lower gate which is pivotable along the bottom edge and actuatable by a power source for movement between an upright closed position wherein it secures the upper gate against the dump body and an open dumping position wherein it serves to direct contents outwardly from the dump body.

2. Description of the Prior Art

Heavy duty dump trucks or trailers of the type used for hauling asphalt to a paving machine typically have a unitary hanging rear gate pivoted at its upper end for swinging outwardly upon dumping of the dump body. Paving machines typically have a hopper extended transversely across a rearward end for receiving asphalt from a dump truck as the paver advances across a street, parking lot or the like for asphalt paving. To be sure that the asphalt is directed into the hopper and not into the space between the dump body and paver, prior art dump bodies were generally provided with a fixed stationary lip extended perhaps 12" rearwardly from the dump body. Problems have occurred with that fixed lip getting caught in the paver as the dump body approaches or leaves the hopper of the paver. The lip is intended to guide asphalt into the hopper but, because the lip is fixed, damage and deformation of the hopper and lip can occur if the lip is not properly moved into clearance above the hopper before the truck moves away from the paving machine hopper. Repair of damage to the hopper is likely to be expensive. As the fixed lip on the dump body becomes bent and deformed over continuous use, it is both unattractive and difficult to clean with a scraping tool such as a shovel. Finally, even a new undamaged fixed lip on a dump body acts as an unnecessary and undesirable rearward extension of the dump body during transport.

Accordingly, a primary object of the present invention is to provide a pivot lip dump gate for a dump body wherein a vertically shortened hanging upper gate is used in combination with a lower gate pivoted along its lower edge for movement between an open dumping position wherein it directs asphalt outwardly away from the dump body and an upright closed position wherein it serves to secure the hanging upper gate in the closed position against the rearward end of the dump body.

Another object is to provide an improved split gate for a dump body which eliminates the need for a conventional fixed stationary lip at the rearward end of the dump body.

Another object is to provide a split gate for a dump body wherein a shorter lower gate serves a double function of a dumping lip in its open dumping position and as a locking device in its upright closed position for securing the hanging upper gate in its closed position.

Another object of the invention is provide a split gate for a dump body wherein the lower gate is power actuated for pivotal movement between its transport and dumping positions.

Another object is to provide a split gate for a dump body wherein the shorter lower gate can float or freely pivot upwardly from its open dumping position to prevent damage to a paving hopper or the like.

Another object is to provide a split gate for a dump body which eliminates the unnecessary and undesirable rearward extension of a fixed lip in a transport position of a dump body.

Another object is to provide a split gate for a dump body which is simple and rugged in construction, economical to manufacture and efficient in operation.

SUMMARY OF THE INVENTION

A pivot lip dump gate for the dump body of a dump truck, trailer or the like includes an upper gate connected to the side walls of the dump body for pivotal movement about a transverse pivot axis adjacent to the top rear corners of the side walls whereby the upper gate is operative to swing outwardly from the side walls to an open position and inwardly to a closed position in engagement with the side walls. A lower gate is connected to the dump body for pivotal movement about a transverse pivot axis adjacent the rearward end of the floor between an open position extending rearwardly from the floor and generally upright closed position closing a lower portion of the open rearward end of the dump body. The lower gate includes a locking device or flange which is engagable with the upper gate in the closed positions of both gates to secure the upper gate in its closed position for transport. A source of power such as an hydraulic cylinder preferably connects the lower gate to the dump body and is actuatable to move the lower gate between its closed transport position and its open dumping position. The power source is deactivated upon movement of the lower gate to the dumping position to enable the lower gate to float and thereby prevent damage to a paver hopper or the like that the lower gate may contact during the dumping operation. The lower gate is preferably of substantially shorter vertical height than the upper gate so as to function much like the fixed stationary lip of known dump bodies when the lower gate is in its open dumping position. The lower gate thus not only serves as a floor extension for directing asphalt or other contents rearwardly away from the dump body but also, upon pivotal movement to its closed transport position, it eliminates the unnecessary and undesirable rearward extension of a fixed lip and also serves to secure the hanging upper gate in its closed transport position.

BRIEF DESCRIPTION OF THE DRAWINGS

FIG. 9 is a partial perspective view of the rear corner of the dump body with a portion of the bracket broken away to show the pivotal support for the lower gate of the pivot lip dump gate in the closed transport position; and FIG. 10 is a partial perspective view of the rear corner of the dump body with a portion of the bracket broken away to show the pivotal support of the lower gate of the pivot lip dump gate in the open dumping position.

DESCRIPTION OF THE PREFERRED EMBODIMENT

Figure 1:
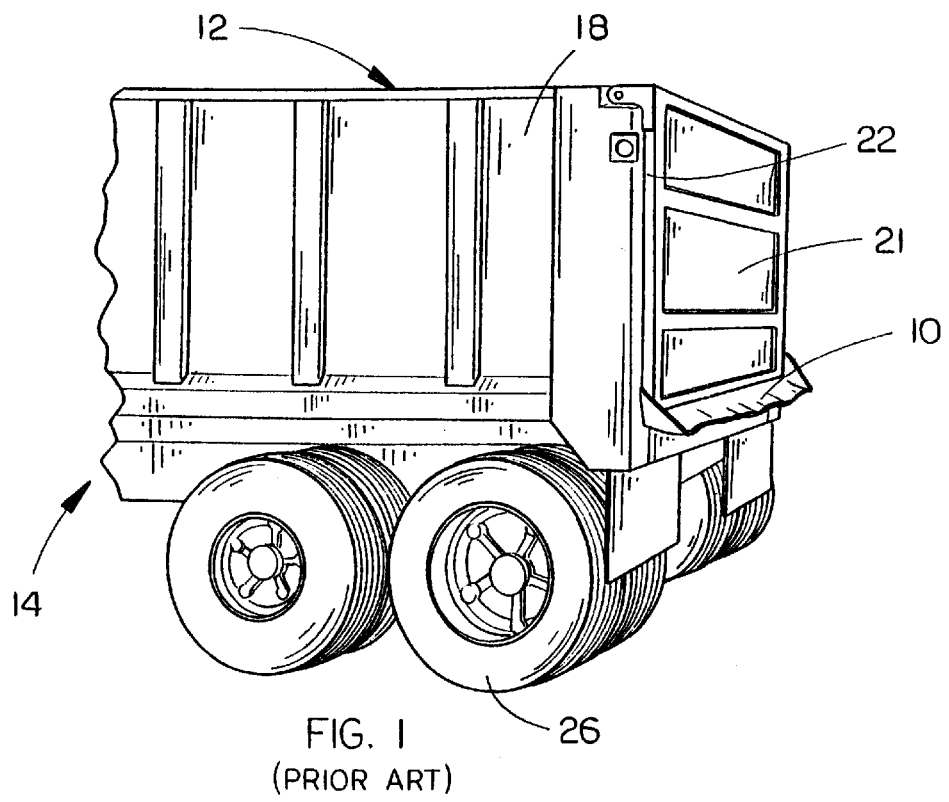
FIG. 1 is a partial perspective view of an existing dump body with the stationary fixed lip bent from use.

The pivot lip dump gate of the present invention is an improvement to resolve problems with the fixed stationary lip 10 of conventional dump bodies 12 of the type illustrated in FIG. 1 on a large dump truck 14. The dump body 12 includes a floor 16, a front wall (not shown), opposite side walls 18 and 20 and a single dump gate 21 closing an open rearward end 22. A lift mechanism (not shown) is provided for pivotally raising the forward end of the dump body for dumping contents from the open rearward end. The fixed stationary lip 10 is provided to direct asphalt or other contents outwardly away from the dump body into a paver hopper 24 or the like. The fixed lip 10 likewise prevents the contents from being dumped onto the rear wheels 26 or into the space between the dump body and paver hopper 24 or other such receptacle. The problem with the fixed lip 10 is that it can strike and damage the paver hopper and catch on the front edge of the paver hopper as the truck separates from the paver if the dump body has not been sufficiently lowered to provide clearance between the fixed lip 10 and hopper 24. As the fixed lip becomes bent and deformed over time, it has an unsightly appearance and is very difficult to clean with a scraping tool such as a shovel. These problems are resolved by the pivot lip dump gate 30 of the invention.

Figure 2:
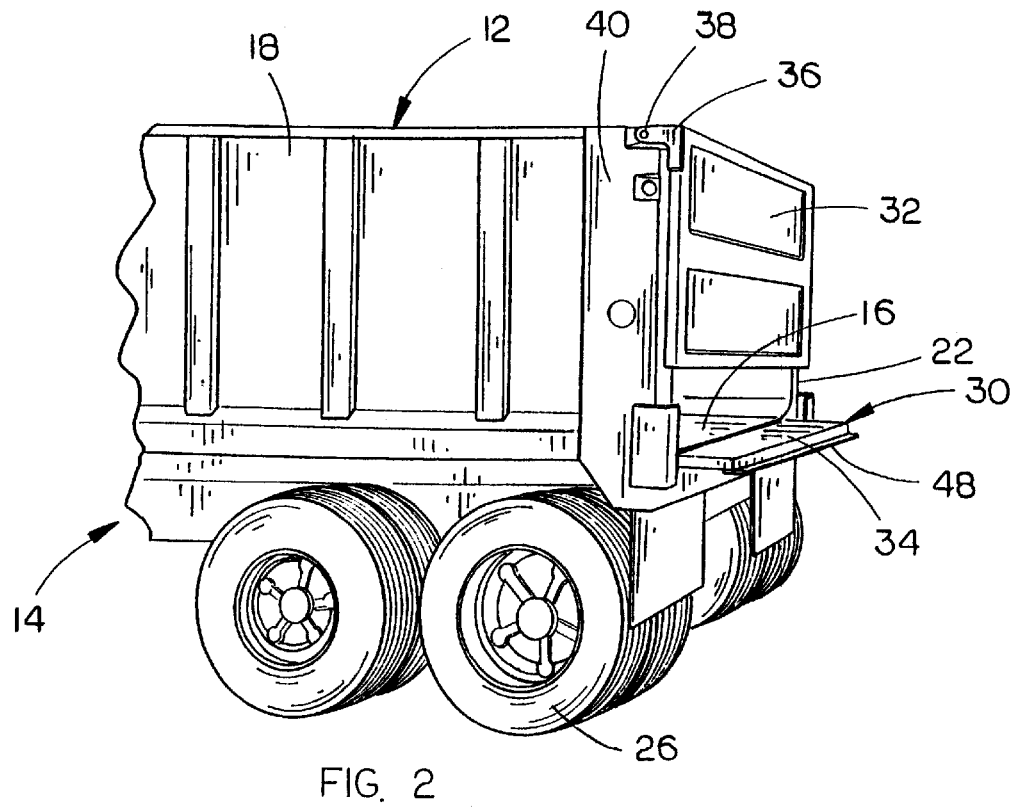
FIG. 2 is a partial perspective view of a dump body equipped with the improved pivot lip dump gate of the invention.
Figure 4:
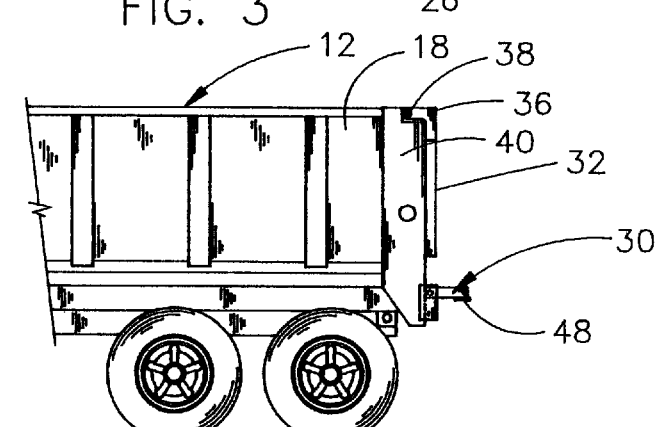
Figure 5:
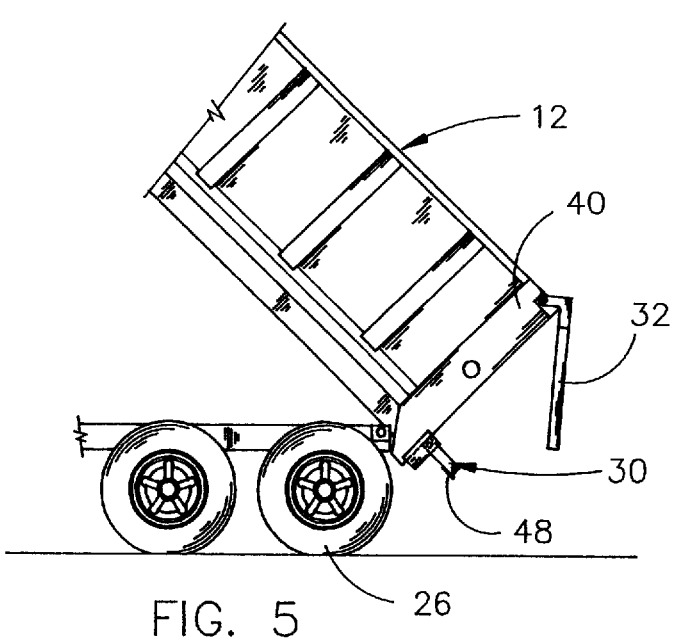

FIG. 2 illustrates the pivot lip dump gate 30 as including a split gate including a hanging upper gate 32 and a lower gate or lip 34. The upper gate 32 is hingedly connected to the side walls 18 and 20, preferably in the same manner that a conventional single dump gate 21 is hingedly supported. Specifically, upper gate 32 is connected to the side walls 18 and 20 by a pair of forwardly extending brackets 36, one on each side, which are pivotally engaged on stub shafts 38 for free swinging movement of the upper gate by gravity as the dump body is moved from its lowered transport position of FIG. 4 to its raised dumping position of FIG. 5. The stub shafts 38 provide a transverse pivot axis adjacent to top rear corners of the side walls 18 and 20 about which the upper gate 32 is operative to swing outwardly away from the side walls to an open dumping position, as illustrated in FIG. 5, and inwardly to a closed transport position as illustrated in FIGS. 2 and 4. In the transport position, the upper gate may be engaged against the side walls 18 and 20. It can be seen in the drawings that the rearward end portion of side walls 18 and 20 are reinforced by appropriate framework 40 for structural integrity and to support the rear gate.

Figure 3:
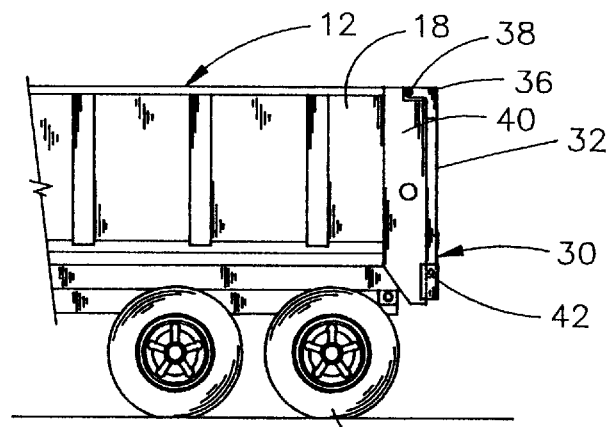
FIGS. 3, 4 and 5 are partial side elevational views showing the pivot lip dump gate in its closed, open and dumping positions, respectively.
Figure 7:
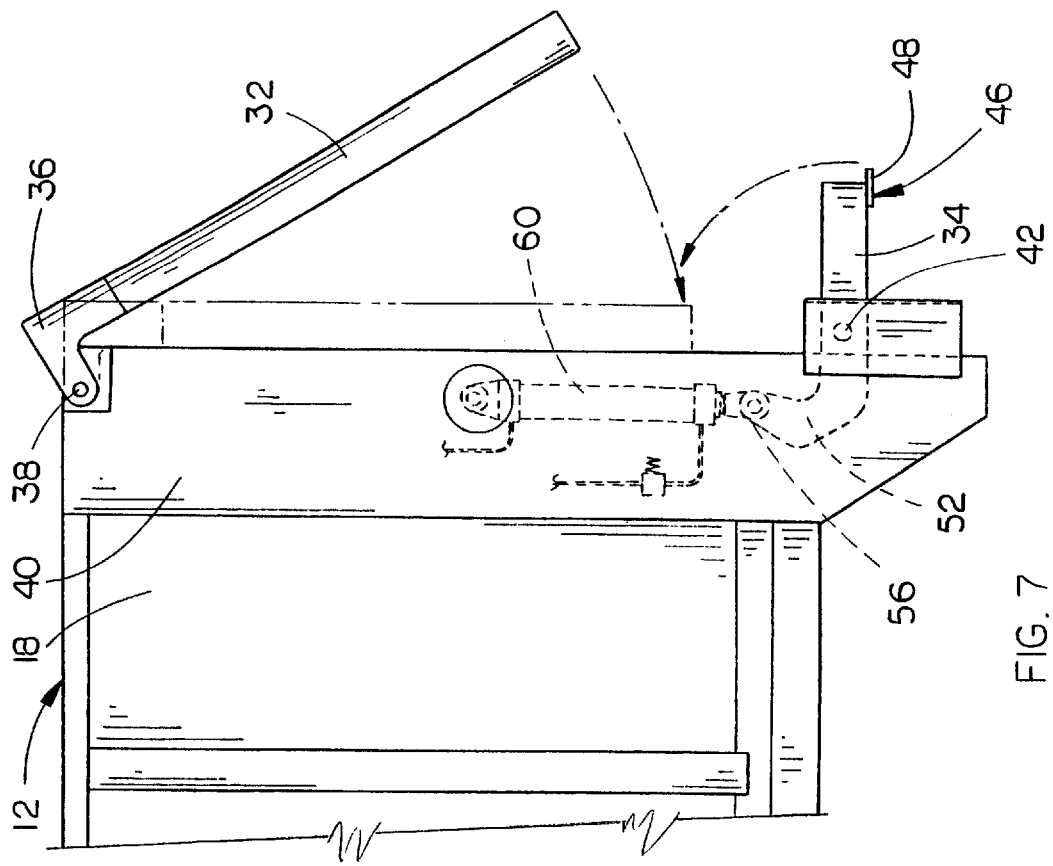
FIG. 7 is a partial side view of the dump body with the actuating cylinder in dotted lines corresponding to the open dumping position of the pivot lip dump gate.
Figure 6:
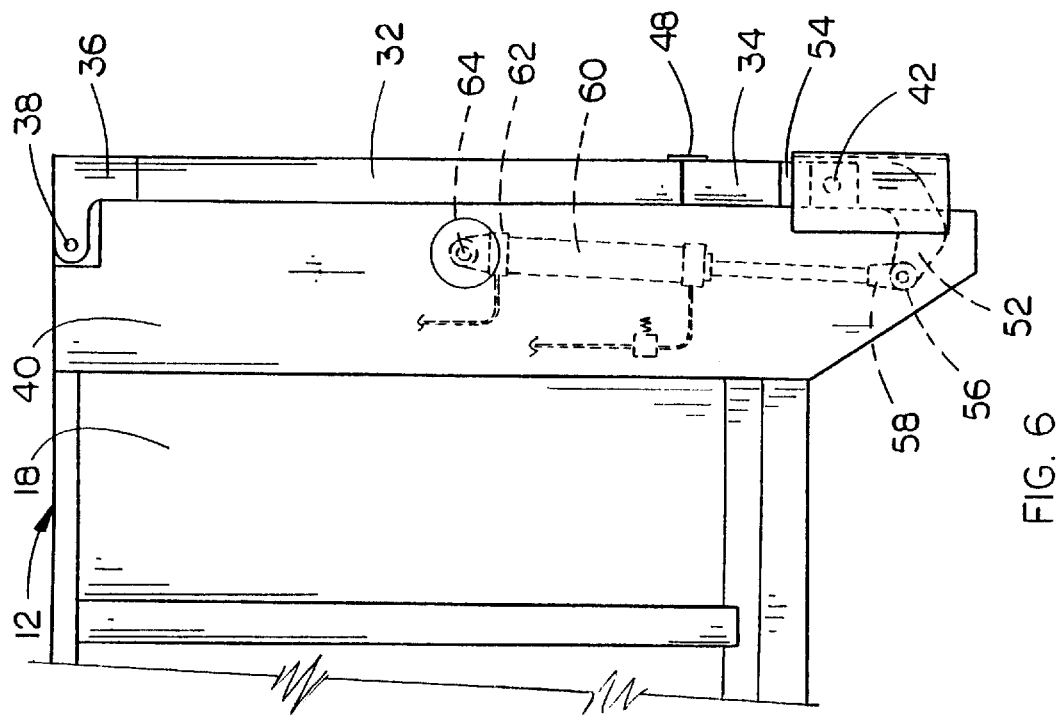
FIG. 6 is a side view of the rearward end of the dump body with the actuating cylinder shown in dotted lines corresponding to the closed position of the pivot lip dump gate.

In a comparison of FIG. 2 with FIG. 1, it can be seen that the upper gate 32 is shortened somewhat compared to the unitary single dump gate 21 of the prior art. The shortened height of the upper gate 32 is compensated for by lower gate 34 which is likewise connected to the dump body 12 for pivotal movement about a transverse pivot axis 42 (FIGS. 6 and 7). That axis 42 is situated adjacent the rearward end of the dump body floor 16 to enable pivotal movement of the lower gate 34 between an open dumping position extending rearwardly from the floor 16 and a generally upright closed transport position closing a lower portion of the open rearward end 22 of the dump body 12. The lower gate is thus generally upright and parallel to the upper gate 32 in the transport position of the dumping body as illustrated in FIG. 3. The upper and lower gates 32 and 34 are shown as being of a size and shape to collectively close the open rearward end 22 of the dump body 12 in the closed transport positions of both gates 32 and 34.

The lower gate 34 is provided with a locking means such as the elongated flange 48 which is secured to the rearward face of the lower gate 34 and which extends upwardly beyond the top edge 50 of the lower gate to serve as a closure lock for securing the upper gate 32 in its closed transport position. The continuous flange 48 is preferred to close any gap between the upper and lower gates 32 and 34 but it alternately could be replaced by one or more upstanding fingers or posts positioned for accomplishing the same function of securing the upper gate in its closed position upon lowering of the dump body and closing of the lower gate 34. The invention is intended to broadly contemplate any type of engagement means between the upper and lower gates 32 and 34 which would secure the upper gate in its closed position upon pivotal movement of the lower gate 34 to its closed transport position.

Figure 8:
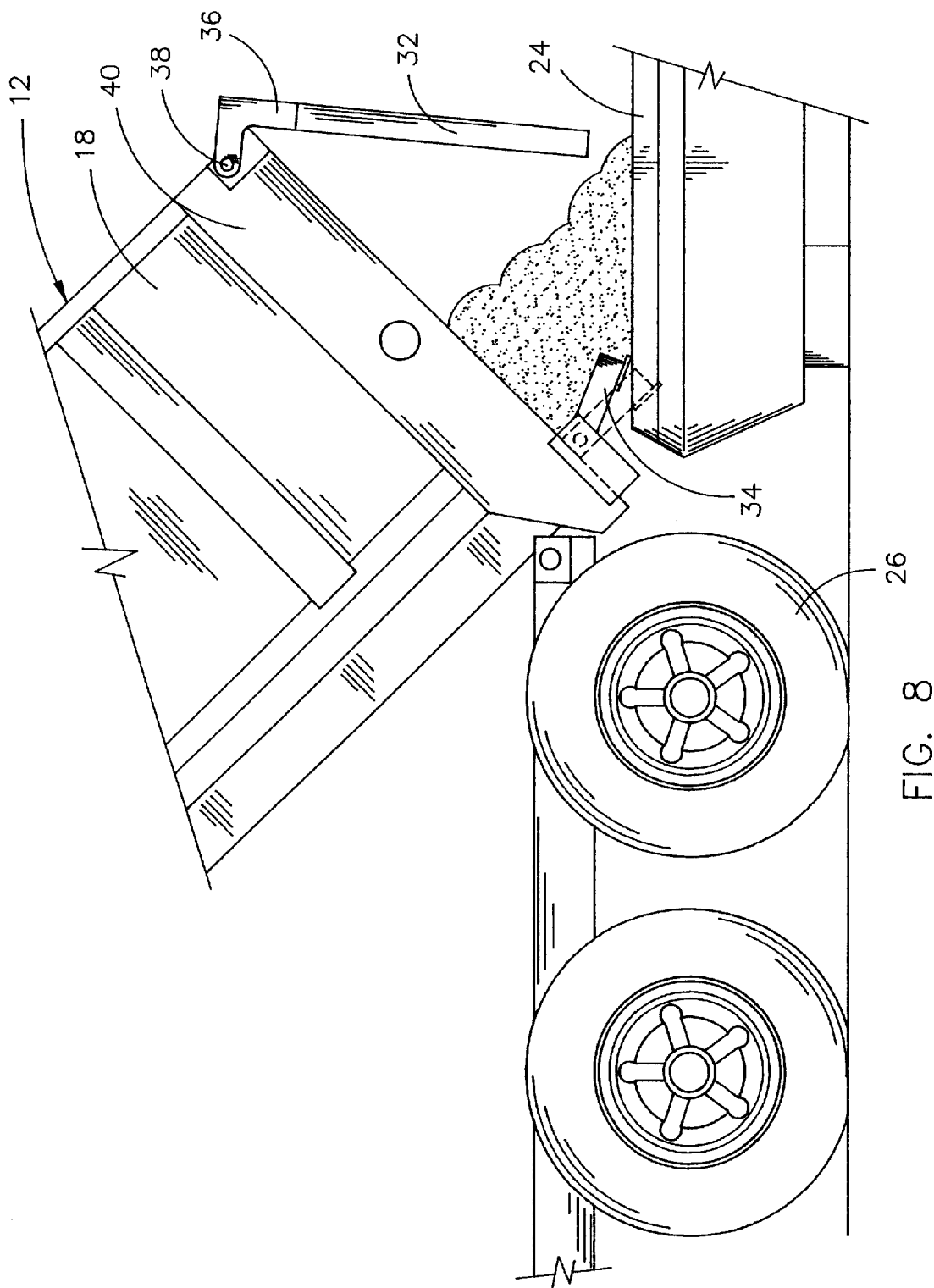
FIG. 8 is a side view of the pivot lip dump gate in a floating dumping position with the dump body raised to empty asphalt into a paver hopper.

The pivotal support of the lower gate 34 is best shown in FIGS. 6–10. A generally J-shaped bracket 50 extends from the lower end of lower gate 34 and has one end 54 connected to the lower gate 34 and an opposite free end 56 pivotally connected to the cylinder end 58 of hydraulic cylinder 60 housed within the sidewall framework 40. The cylinder end 62 of hydraulic cylinder 60 is pivotally connected to the dump body by an appropriate coupling for pivotal movement about a transverse axis 64. Upon retraction of hydraulic cylinder 60 from the extended position of FIG. 6 to the retracted position of FIG. 7, the J-shaped bracket 52 is lifted to pivot lower gate 34 about its pivot axis 42 from its closed transport position to its lowered dumping position. In the lowered dumping position, the lower gate 34 is preferably parallel to the dump body floor 16. Hydraulic cylinder 60 is preferably connected to the hydraulic system of the dump truck and actuatable from the cab of the truck. Once the lower gate 34 is fully opened, the hydraulic cylinder 60, or any other alternate power source is deactivated to enable the lower gate to float, i.e. freely pivot upwardly in the event that an obstruction is encountered such as the front edge of paver hopper 24 as illustrated in FIG. 8. Whereas hydraulic cylinder 60 is shown as a preferred power source for pivoting the lower gate 34, it is understood that an electric motor, hand crank or any other power source could be substituted for the hydraulic cylinder 60.

Upon a dump truck 14 approaching a hopper 24 for dumping asphalt into the hopper as illustrated in FIG. 8, the lower gate 34 may be maintained in its raised closed position until the dump body 12 is moved sufficiently close to provide clearance for lowering of the lower gate 34 into the hopper 24 rather than striking the outer wall of the hopper. The lowered lower gate then serves to direct the asphalt into the hopper so that it is not spilled between the dump body and hopper. The upper gate 32 is swung rearwardly out of the way by gravity. If the lower gate contacts the hopper during the dumping operation, no damage is done because the lower gate is free to float or pivot. Upon completion of the dumping operation, the floating condition of the lower gate 34 likewise prevents damage in the event that the truck body is advanced away from the hopper before the dump body is sufficiently lowered to provide vertical clearance between the lower gate 34 and hopper 24. Once the dump body is lowered to its transport position as illustrated in FIG. 4, the upper gate 32 swings to its closed position by gravity and the hydraulic cylinder 60 may be actuated to pivotally raise the lower gate 34 to its closed transport position of FIG. 3. In that position, the locking flange 48 engages the lower edge of upper gate 32 to lock it in its closed transport position.

Thus there has been shown and described a pivot lip dump gate which accomplishes all of the stated objects.

I claim:

1. A pivot lip dump gate for a dump body having longitudinally spaced apart forward and rearward ends, a floor, a front wall, opposite side walls and an open rearward end and means for pivotally raising the forward end thereof for dumping contents from the open rearward end, the dump gate comprising:

an upper gate connected to said side walls for pivotal movement about a transverse pivot axis adjacent top rear corners of said side walls whereby said upper gate is operative to swing outwardly away from said side walls to an open position and inwardly to a closed position in engagement with said side walls to close a portion of the open rearward end of the dump body;

a lower gate connected to said dump body for pivotal movement about a transverse pivot axis adjacent and spaced rearwardly of the rearward end of said floor between an open position extending rearwardly from said floor and a closed position in engagement with said side walls to close a portion of the open rearward end of the dump body;

said lower gate including lock means engagable with said upper gate when both the upper and lower gates are in the closed position for securing said upper gate in the closed position thereof;

an extendable cylinder operatively connected between the dump body and the lower gate and operable to pivot the lower gate between the closed and open positions; and at least one J-shaped lever having a generally vertical stem portion and a transversely projecting leg portion, the stem portion mounted to said lower gate and extending downwardly beyond a lower end of the lower gate, the leg portion projecting forwardly from the lower gate and connected to said cylinder;

said lever pivotally connected along its stem portion to said pivot axis of the lower gate for pivotal movement with the lower gate.

2. The pivot lip dump gate of claim 1, wherein said cylinder may be selectively operated to a "float" condition, permitting free extension and retraction and thereby permitting free pivotal movement of the lower gate.

3. A pivot lip dump gate for a dump body having longitudinally spaced apart forward and rearward ends, a floor, a front wall, opposite side walls and an open rearward end and means for pivotally raising the forward end thereof for dumping contents from the open rearward end, the dump gate comprising:

a split gate including an upper gate of a size and shape to close an upper portion of said open rearward end and a lower gate of a size and shape to close a lower portion of said open rearward end;

means for pivotally connecting said upper gate to said side walls adjacent to the top of said upper gate for swinging movement of the bottom of the upper gate toward and outwardly away from said open rearward end;

means for pivotally connecting said lower gate to said dump body adjacent and spaced rearwardly of said floor for swinging movement of the top of the lower gate toward and outwardly away from said open rearward end;

said lower gate including lock means engagable with said upper gate upon swinging movement of both gates to generally parallel closed positions closing the open rearward end of said dump body to secure said upper gate in said closed position thereof;

means for limiting outward swinging movement of said lower gate to an open position generally parallel with said floor;

an extendable cylinder operatively connected between the dump body and the lower gate and operable to pivot the lower gate between the closed and open positions; and at least one J-shaped lever having a generally vertical stem portion and a transversely projecting leg portion, the stem portion mounted to said lower gate and extending downwardly beyond a lower end of the lower gate, the leg portion projecting forwardly from the lower gate and connected to said cylinder;

said lever pivotally connected along its stem portion to said pivot axis of the lower gate for pivotal movement with the lower gate.

4. The pivot lip dump gate of claim 3, wherein said cylinder may be selectively operated to a "float" condition, permitting free extension and retraction and thereby permitting free pivotal movement of the lower gate.

5. In a dump body having longitudinally spaced apart forward and rearward ends, a floor, a front wall, opposite side walls and an open rearward end and means for pivotally raising the forward end thereof for dumping contents from the open rearward end, the improvement comprising a pivot lip dump gate including:

an upper gate connected to said side walls for pivotal movement about a transverse pivot axis adjacent top rear corners of said side walls whereby said upper gate is operative to swing outwardly away from said side walls to an open position and inwardly to a closed position closing a portion of said open rearward end;

a lower gate connected to said dump body for pivotal movement above a transverse pivot axis adjacent and spaced rearwardly of the rearward end of said floor between an open position extending rearwardly from said floor and a closed position closing a portion of the open rearward end of the dump body;

said lower gate including lock means engagable with said upper gate when both the upper and lower gates are in the closed positions for securing said upper gate in the closed position thereof;

an extendable cylinder operatively connected between the dump body and the lower gate and operable to pivot the lower gate between the closed and open positions; and at least one J-shaped lever having a generally vertical stem portion and a transversely projecting leg portion, the stem portion mounted to said lower gate and extending downwardly beyond a lower end of the lower gate, the leg portion projecting forwardly from the lower gate and connected to said cylinder;

said lever pivotally connected along its stem portion to said pivot axis of the lower gate for pivotal movement with the lower gate.

6. The pivot lip dump gate of claim 5, wherein said cylinder may be selectively operated to a "float" condition, permitting free extension and retraction and thereby permitting free pivotal movement of the lower gate.

* * * * *